(12) United States Patent  
Beranek

(10) Patent No.: US 8,023,784 B1
(45) Date of Patent: Sep. 20, 2011

(54) OPTICAL SUBASSEMBLY PACKAGE CONFIGURATION

(75) Inventor: Mark W. Beranek, Leonardtown, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 444 days.

(21) Appl. No.: 12/404,550

(22) Filed: Mar. 16, 2009

(51) Int. Cl.
*G02B 6/32* (2006.01)

(52) U.S. Cl. ............... 385/33; 385/53; 385/60; 385/78; 385/88; 385/92; 385/93; 385/138

(58) Field of Classification Search .............. 385/53, 385/60, 63, 72, 74, 78, 84, 88, 89, 92, 93, 385/94, 138, 139, 33; 398/135, 136, 137, 398/139
See application file for complete search history.

(56) References Cited

U.S. PATENT DOCUMENTS

| | | | | |
|---|---|---|---|---|
| 5,140,659 | A * | 8/1992 | Minds et al. | 385/66 |
| 5,692,086 | A * | 11/1997 | Beranek et al. | 385/94 |
| 7,002,131 | B1 * | 2/2006 | Lewis | 250/214 A |
| 7,137,745 | B2 * | 11/2006 | Uekawa | 385/93 |
| 7,215,883 | B1 * | 5/2007 | Lewis | 398/25 |
| 2001/0024551 | A1* | 9/2001 | Yonemura et al. | 385/88 |
| 2004/0184744 | A1* | 9/2004 | Uekawa | 385/93 |

\* cited by examiner

*Primary Examiner* — Brian Healy
(74) *Attorney, Agent, or Firm* — Mark O. Glut; Mark D. Kelly

(57) ABSTRACT

An optical subassembly package configuration for monitoring a fiber, the configuration includes a container, an optical subassembly, an optical fiber, and a ferrule. The container has a face, and the optical subassembly is disposed within the container. The optical fiber communicates with the subassembly. The ferrule is attached to the face of the container, the fiber being monitored terminates inside the ferrule.

12 Claims, 1 Drawing Sheet

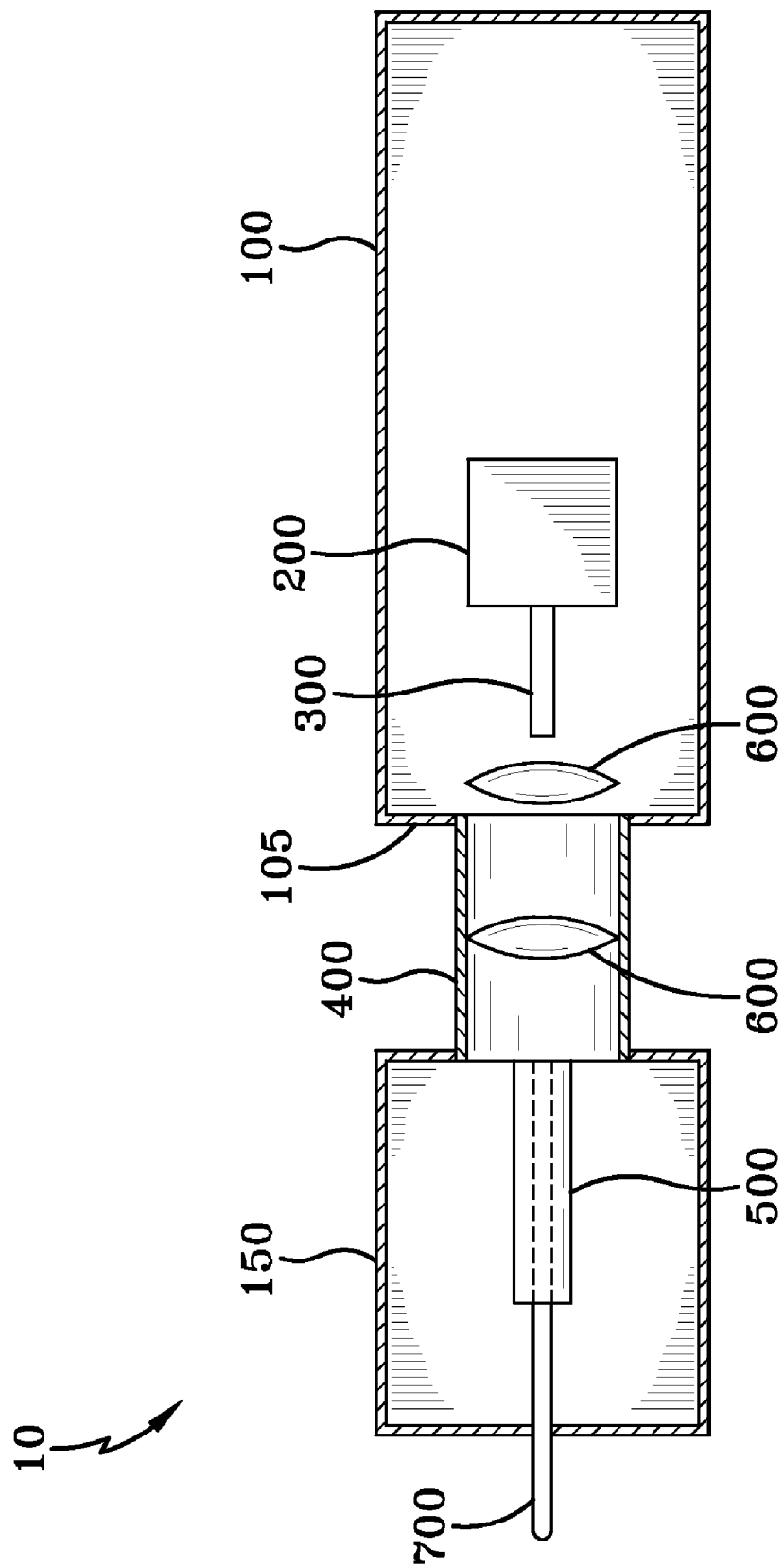

OPTICAL SUBASSEMBLY PACKAGE CONFIGURATION

STATEMENT OF GOVERNMENT INTEREST

The invention described herein may be manufactured and used by or for the Government of the United States of America for governmental purposes without payment of any royalties thereon or therefor.

BACKGROUND

The present invention relates to an optical subassembly package configuration. More specifically, but without limitation, the present invention relates to built in test optical subassembly technology in fiber optic transceiver packages.

The United States Navy identified the need to incorporate optical built in test technology in avionics fiber optic links. Utilizing currently known methods, isolation accuracy is limited to 33.3% maximum. This poor accuracy is typically caused by ambiguity between the transmitter Weapons Replaceable Assembly (WRA), the receiver WRA, and the fiber optic cabling between the WRAs.

Thus, there is a need for laser power monitoring and laser reflectometry monitoring for isolating faults down to the fiber optic transmitter, receiver, and cable plant level.

SUMMARY

The present invention is directed to an optical subassembly package configuration that meets the needs enumerated above and below.

The present invention is directed to an optical subassembly package configuration for monitoring a fiber. The configuration includes a container, an optical subassembly, an optical fiber, and a ferrule. The container has a face, and the optical subassembly is disposed within the container. The optical fiber communicates with the subassembly and extends out from the subassembly. The ferrule is attached to the face of the container, the fiber being monitored terminates inside the ferrule.

It is a feature of the present invention to provide an optical subassembly package configuration that enables laser power monitoring and cable plant reflectometry monitoring in a silicon optical bench built in test optical subassembly fiber optic transceiver module packaging configuration.

DRAWINGS

These and other features, aspects and advantages of the present invention will become better understood with reference to the following description and appended claims, and accompanying drawing wherein:

FIG. 1 is a side view of an embodiment of the optical subassembly package configuration.

DESCRIPTION

The preferred embodiments of the present invention are illustrated by way of example below and in FIG. 1. As seen in FIG. 1, the optical subassembly package configuration 10 for monitoring a fiber 700 includes a container 100, an optical subassembly 200, an optical fiber 300, a nosetube 400, a ferrule 500 and lenses 600 for transferring light or signals in and out of the container 100. The container 100 has a face 105 (a face may be defined, but without limitation, as a bounding surface of a solid figure), and the optical subassembly 200 and the optical fiber 300 are disposed within the container 100. The nosetube 400, proximate to the container 100, extends from the face 105 of the container 100. The optical fiber 300 extends from the optical subassembly 200 to or toward the face 105 of the container 100. The optical fiber 300 communicates with the optical subassembly 200 such that a signal from the optical subassembly 200 passes through the optical fiber 300, through the nosetube 400 via the lenses 600 to the fiber 700 being monitored such that faults on the fiber 700 being monitored can be located. The ferrule 500 is attached to the face 105 of the container 100 via the nosetube 400, the fiber 700 being monitored extends from the ferrule 500, typically away from the nosetube 400 and the container 100.

In the description of the present invention, the invention will be discussed in an avionic or aircraft fiber link environment; however, this invention can be utilized for any type of need that requires use of a optical bench fiber optic transmitter or transceiver optical subassembly. The package configuration 10 may be used, but without limitations, in military operations, communications, and various other electronic uses. Additionally, the same techniques and/or package configuration described here for laser diodes can be applied to surface emitting and edge emitting LEDs, as well as other types of lasers.

The optical subassembly package configuration 10 may include a connector 150. The ferrule 500 and part of the fiber 700 being monitored may be disposed within the connector 150. As shown in FIG. 1, the fiber 700 being monitored may extend from the ferrule 500 out from the connector 150. The connector 150 may be attachable to the nosetube 400.

A container 100 may be described as anything that can hold or include something within its volume. The container 100 may be manufactured from any material practicable, such as for example, without limitation, metal, plastic, ceramic, etc. As shown in FIG. 1, at least one lens 600 may be disposed in the container 100. In the preferred embodiment the lens 600 may be disposed at or near the face of the container 105 proximate to the optical fiber 300, near the nosetube 400, and/or within the nosetube 600. FIG. 1 shows a lens 600 disposed within the nosetube 400, and a lens 600 disposed within the container 100 near the face 105 of the container 100. The lenses 600 are aligned such that light or signals can pass from the optical fiber 300, through the nosetube 400 to the fiber 700 being monitored.

An optical subassembly 200 may be described as an apparatus that can perform optical power monitoring, and/or determine, isolate or identify faults in a fiber optic link, as well as other information regarding fibers. The preferred optical subassembly is a Built-In-Test (BIT) optical subassembly; however, any type of optical assembly may be utilized.

An optical fiber 300 may be defined, but without limitation as, a waveguide medium used to transmit information via light impulses rather than through the movement of electrons. The preferred optical fiber 300 is a multimode optical fiber transmitting in the about 800 to about 1600 nm range. The optical fiber 300 may be actively aligned to the lenses 600 and locked in place inside the container 100.

A ferrule 500 may be defined as, a component (usually a rigid tube) used to align and protect the stripped end of a fiber. The fiber 700 being monitored enters the connector 150 and may be bonded to the ferrule 500 and polished for splitting or connecting two fibers together. The ferrule 500 keeps the fiber 700 accurately aligned within the connector 150. Ferrules 500 can be made of glass, plastic, metal, ceramic material, or any material practicable. The ferrule 500 may be either fixed or detachable.

The nosetube 400 may be soldered, welded or brazed to the connector 150 which contains the ferrule 500. The ferrule 500 may be rigidly attached to the nosetube 400 in a manner that allows an external fiber optic connector to be attached and de-attached (mated and de-mated) from the container 100.

The package configuration 10 operates as a digital fiber optic transmitter whereby digital optical pulses are emitted from the fiber 700 being monitored. The built in test capability is enabled by the optical subassembly 200 within the package. Electronic circuitry drives the optical subassembly 200 light source, which is preferably a laser diode, contained within the package configuration 10. Electronic circuitry receives and processes photocurrent signals generated from a photodetector inside the optical subassembly 200. The photocurrent signals then pass through the optical fiber 300, through the nosetube 400 via the lenses 600, to the ferrule 500 then into and through the fiber 700 being monitored and then back to the optical subassembly 200 along the same path. The photodetector is excited by reflected light signals returned from the fiber 700 being monitored and by light emitted by the optical subassembly 200 light source. Thus, the package can operate in two modes; 1) as a digital optical transmitter with laser diode power monitoring, and 2) a fiber optic light source and detector combination that enables fiber optic link faults to be identified in situ without having to disconnect connectors or using external test equipment to troubleshoot the fiber optic link. When operating in the digital optical transmitter mode the transmitter is excited with digital electrical signal pulses which are converted to optical signal pulses inside the package. The laser power monitoring circuitry acts as a feedback loop to control the optical power emitted from the fiber 700 being monitored. When operating in the fiber optic fault link mode the optical subassembly 200 light source is biased at a predetermined voltage and excited with short electrical pulses which are converted to short optical pulses emitted from the fiber 700. The reflected optical pulse excites the optical subassembly 200 photodetector at a time period proportional to the distance where the reflection occurred. The time period information is processed by a microprocessor integrated circuit which calculates the actual distance of fiber optic failure.

When introducing elements of the present invention or the preferred embodiment(s) thereof, the articles "a," "an," "the," and "said" are intended to mean there are one or more of the elements. The terms "comprising," "including," and "having" are intended to be inclusive and mean that there may be additional elements other than the listed elements.

Although the present invention has been described in considerable detail with reference to a certain preferred embodiments thereof, other embodiments are possible. Therefore, the spirit and scope of the appended claims should not be limited to the description of the preferred embodiment(s) contained herein.

What is claimed is:

1. An optical subassembly package configuration for monitoring a fiber, the configuration comprising:
   a container, the container having a face;
   an optical subassembly, the optical subassembly disposed within the container;
   an optical fiber, the optical fiber communicating with the subassembly and extending from the subassembly toward the face of the container; and
   a ferrule, the ferrule attached to the face of the container, the fiber being monitored terminating inside the ferrule.

2. The configuration of claim 1, wherein the configuration further includes a nosetube, the nosetube connecting the ferrule and the container.

3. The configuration of claim 1, wherein the configuration further includes lenses for transferring light in and out of the container.

4. An optical subassembly package configuration for monitoring a fiber, the configuration comprising: a container, the container having a face; an optical subassembly, the optical subassembly disposed within the container; an optical fiber, the optical fiber communicating with the subassembly and extending from the subassembly towards the face of the container; a nosetube; a connector, a ferrule disposed within the connector, the fiber being monitored terminating inside the ferrule and extending from the connector, the nosetube connecting the container to the connector; and lenses for transferring light in and out of the container and through the nosetube towards the fiber being monitored.

5. The configuration of claim 4, wherein one lens is disposed within the nosetube, while the other lens is disposed near the face of the container.

6. The configuration of claim 5, wherein the optical subassembly is a Built-In-Test (BIT) optical subassembly.

7. The configuration of claim 6, wherein the connector is detachable from the nosetube.

8. An optical subassembly package configuration for monitoring a fiber, the configuration comprising:
   a container, the container having a face;
   an optical subassembly;
   an optical fiber, the optical subassembly and the optical fiber disposed within the container, the optical fiber extending from the optical subassembly toward the face of the container;
   a nosetube, the nosetube proximate to the container and extending from the face of the container;
   a ferrule, the ferrule attached to the face of the container via the nosetube, the fiber being monitored extending from the ferrule; and
   lenses for transferring signals in and out of the container, the optical fiber communicating with the optical subassembly such that a signal from the optical subassembly passes through the optical fiber, through the nosetube via the lenses, to the fiber being monitored and back to the optical subassembly such that faults on the fiber being monitored can be located.

9. The configuration of claim 8, wherein the ferrule communicates with the nosetube such that the ferrule may be mated or demated from the nosetube.

10. The configuration of claim 9, wherein the configuration further includes a connector, the ferrule and part of the fiber being monitored disposed within the connector, the fiber being monitored terminating inside the ferrule and extending from the connector, and the nosetube connecting the container to the connector.

11. The configuration of claim 9, wherein the optical subassembly is a Built-In-Test (BIT) optical subassembly.

12. The configuration of claim 10, wherein the optical fiber is a multimode optical fiber transmitting in the about 800 to about 1600 nm range.

* * * * *